United States Patent
Osawa

(10) Patent No.: US 11,856,164 B2
(45) Date of Patent: Dec. 26, 2023

(54) TRANSPORT APPARATUS, IMAGE SCANNER, AND PRINTER COMPRISING A TRANSMITTER, RECEIVER, A LONG-DISTANCE SOUND FIELD, SELECTING A BEAM DIAMETER FROM A PLURALITY OF BEAM DIAMETERS AT A SHORT-DISTANCE SOUND FIELD LIMIT DISTANCE

(71) Applicant: SEIKO EPSON CORPORATION, Tokyo (JP)

(72) Inventor: Eiji Osawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/134,927

(22) Filed: Dec. 28, 2020

(65) Prior Publication Data
US 2021/0203801 A1    Jul. 1, 2021

(30) Foreign Application Priority Data

Dec. 26, 2019 (JP) ................................ 2019-235873

(51) Int. Cl.
*H04N 1/00* (2006.01)
*H04N 1/12* (2006.01)
*G01B 17/02* (2006.01)

(52) U.S. Cl.
CPC ......... *H04N 1/00599* (2013.01); *G01B 17/02* (2013.01); *H04N 1/00716* (2013.01); *H04N 1/00729* (2013.01); *H04N 1/123* (2013.01)

(58) Field of Classification Search
CPC ............... G01B 17/02; H04N 1/00599; H04N 1/00716; H04N 1/00729; H04N 1/123;
(Continued)

(56) References Cited

U.S. PATENT DOCUMENTS

2008/0203654 A1* 8/2008 Chujo ...................... B65H 7/12
271/262
2013/0216291 A1* 8/2013 Fukusaka ............... B65H 3/128
400/583

(Continued)

FOREIGN PATENT DOCUMENTS

JP        H0672591 U      10/1994
JP        2008207885 A     9/2008

(Continued)

OTHER PUBLICATIONS

NDT Resource Center, title: Radiated Fields of Ultrasonic Transducers, https://legacy-nde.engineering.iastate.edu/EducationResources/CommunityCollege/Ultrasonics/EquipmentTrans/radiatedfields.htm, Copyright year:2012, Pertinent page: whole page. (Year: 2012).*

(Continued)

*Primary Examiner* — Chad Dickerson
(74) *Attorney, Agent, or Firm* — CHIP LAW GROUP

(57) ABSTRACT

A transport apparatus includes a transport path on which a medium is transported; a transmitter configured to transmit an ultrasonic wave to the medium transported on the transport path; and a receiver configured to receive an ultrasonic wave from the medium, in which the transport path is provided between the transmitter and the receiver, and is provided in a long-distance sound field of an ultrasonic wave transmitted from the transmitter.

9 Claims, 15 Drawing Sheets

(58) Field of Classification Search
CPC ...... H04N 1/00628; B65H 7/12; B65H 7/125; B65H 2553/30; B65H 2553/82; B65H 2553/822
USPC ........ 358/400–404, 514, 505, 435, 436, 498
See application file for complete search history.

(56) References Cited

U.S. PATENT DOCUMENTS

| | | | |
|---|---|---|---|
| 2014/0091516 A1* | 4/2014 | Okitsu | B65H 7/125 |
| | | | 271/262 |
| 2016/0159605 A1* | 6/2016 | Miyahara | B65H 37/04 |
| | | | 270/1.01 |
| 2018/0143015 A1 | 5/2018 | Maeda et al. | |
| 2019/0265374 A1* | 8/2019 | Arai | B65H 7/125 |
| 2019/0353480 A1* | 11/2019 | Osawa | G01N 29/27 |

FOREIGN PATENT DOCUMENTS

| | | | |
|---|---|---|---|
| JP | 2018083686 A | 5/2018 | |
| WO | 2013001762 A1 | 1/2013 | |

OTHER PUBLICATIONS

Olympus, Title: Review of Conventional Beam Characteristics, https://www.olympus-ims.com/en/ndt-tutorials/transducers/characteristics/, Wayback machine has document stored from Oct. 2008 to Dec. 2017, Pertinent page: whole page. (Year: 2008).*
Wanjia, Gao, et al., title: Study of Ultrasonic Near-Field Region in Ultrasonic Liquid-Level Monitoring System, Pub Date: Aug. 10, 2020, https://www.ncbi.nlm.nih.gov/pmc/articles/PMC7465672/, Pertinent Sections: Intro, sections 2.1-2.3. (Year: 2020).*

* cited by examiner

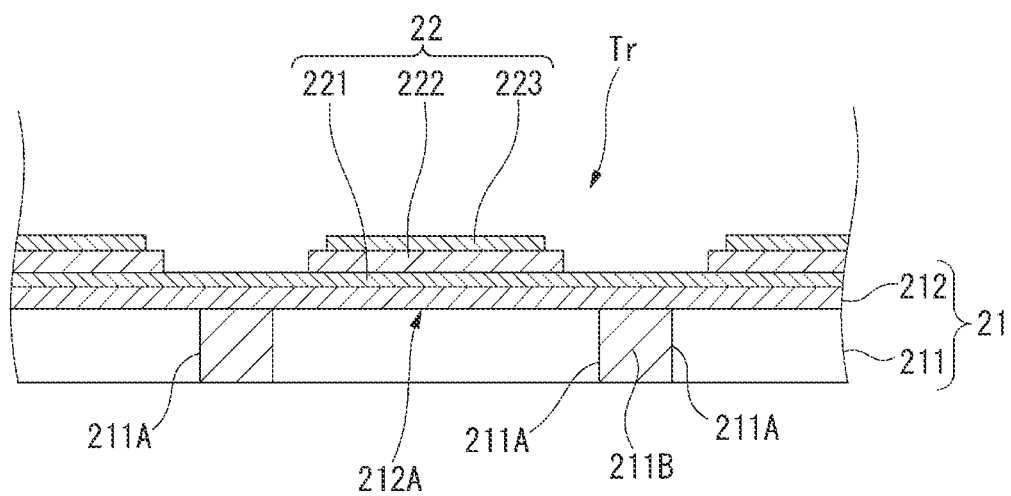
FIG. 4
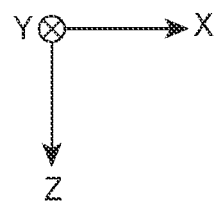

TRANSPORT APPARATUS, IMAGE SCANNER, AND PRINTER COMPRISING A TRANSMITTER, RECEIVER, A LONG-DISTANCE SOUND FIELD, SELECTING A BEAM DIAMETER FROM A PLURALITY OF BEAM DIAMETERS AT A SHORT-DISTANCE SOUND FIELD LIMIT DISTANCE

The present application is based on, and claims priority from JP Application Serial Number 2019-235873, filed Dec. 26, 2019, the disclosure of which is hereby incorporated by reference herein in its entirety.

BACKGROUND

1. Technical Field

The present disclosure relates to a transport apparatus that transports a medium, an image scanner, and a printer.

2. Related Art

In the related art, a transport apparatus that transports a sheet-shaped medium such as a paper sheet or a film has been known. In such a transport apparatus, when detecting multi-feed of the medium or determining a thickness or a type of the medium, an ultrasonic wave sensor may be provided at a transport position of the medium (for example, see JP-A-2008-207885).

In JP-A-2008-207885, a transmitter that transmits ultrasonic waves and a receiver that receives the ultrasonic waves are provided with a transport path that transports a medium being sandwiched therebetween. Transport guide plates are provided between the transport path and the transmitter and between the transport path and the receiver, respectively. Further, the transport guide plate provided between the transport path and the transmitter includes an incidence port through which the ultrasonic waves pass, and the transport guide plate provided between the transport path and the receiver includes an emission port through which the ultrasonic waves pass. Then, in the transport apparatus, the incidence port is opened larger than a transmission surface of ultrasonic waves of the transmitter, and the emission port is opened so as to be equal to or smaller than a reception surface of ultrasonic waves of the receiver. Accordingly, a disadvantage that a part of the ultrasonic waves transmitted from the transmitter is multiple-reflected and received by the receiver as a noise component can be prevented.

However, ultrasonic waves (transmission waves) transmitted from the transmitter are propagated as plane waves within a short-distance sound field limit distance, and a sound pressure distribution of the ultrasonic waves becomes complicated. Therefore, in a transport apparatus as described in JP-A-2008-207885, when a medium is positioned within a short-distance sound field limit distance, a complicated sound pressure distribution is also superimposed on ultrasonic waves (reception waves) propagated from the medium toward a receiver, and a reception signal including a noise component is output from the receiver. Therefore, when determining, based on a reception signal, whether the medium transported by the transport apparatus is multi-fed, or when determining, based on the reception signal, a thickness and a type of the medium, determination accuracy may be lowered.

SUMMARY

A transport apparatus according to a first aspect includes: a transport path on which a medium is transported; a transmitter configured to transmit an ultrasonic wave to the medium transported on the transport path; and a receiver configured to receive an ultrasonic wave from the medium, in which the transport path is provided between the transmitter and the receiver, and is provided in a long-distance sound field of an ultrasonic wave transmitted from the transmitter.

An image scanner according to a second aspect includes the transport apparatus according to the first aspect, and a scanning unit configured to read an image formed on the medium transported by the transport apparatus.

A printer according to a third aspect includes the transport apparatus according to the first aspect, and a printing unit configured to form an image on the medium transported by the transport apparatus.

BRIEF DESCRIPTION OF THE DRAWINGS

FIG. 4 is a cross-sectional view showing a schematic configuration of a part of a transmission main body portion of the ultrasonic wave sensor.

DESCRIPTION OF EXEMPLARY EMBODIMENTS

First Embodiment

Hereinafter, a first embodiment according to the present disclosure will be described.

Figure 1:
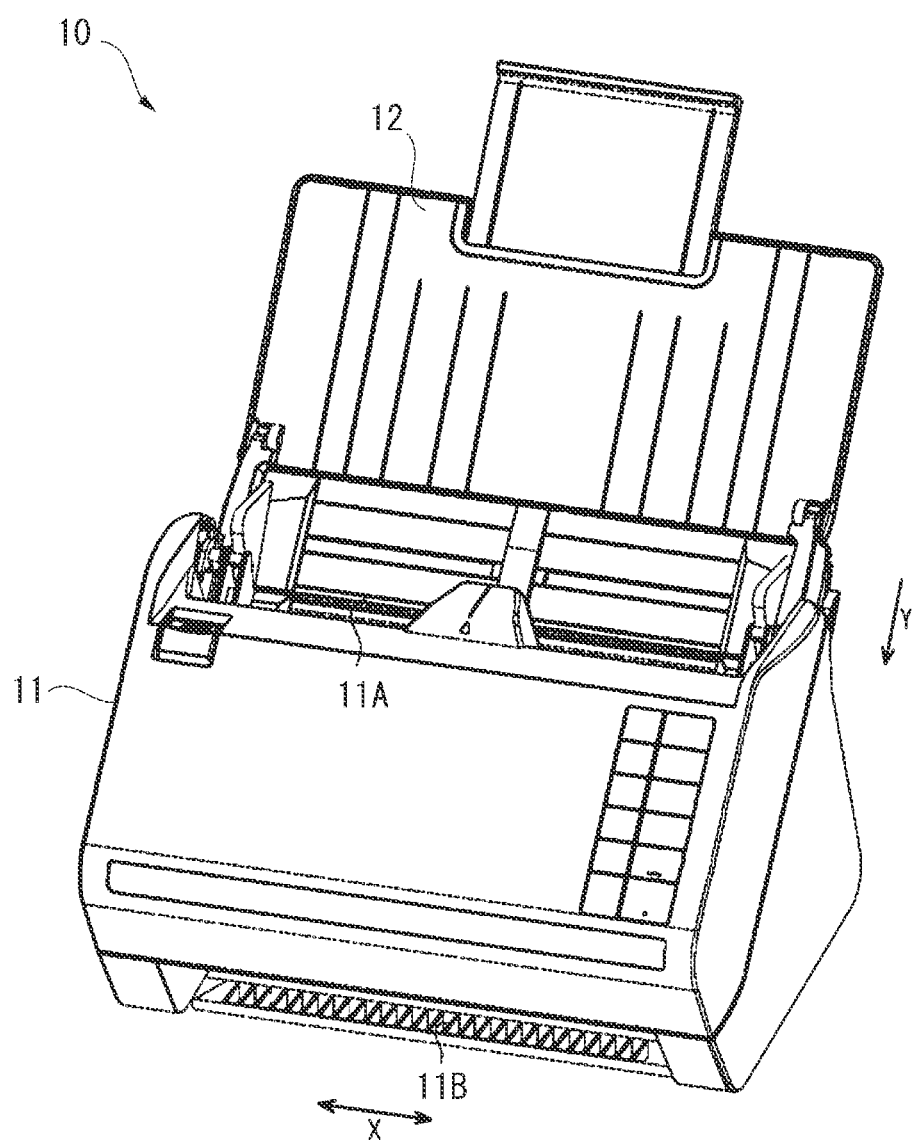
FIG. 1 is an external view showing a schematic configuration of an image scanner according to a first embodiment.
Figure 2:
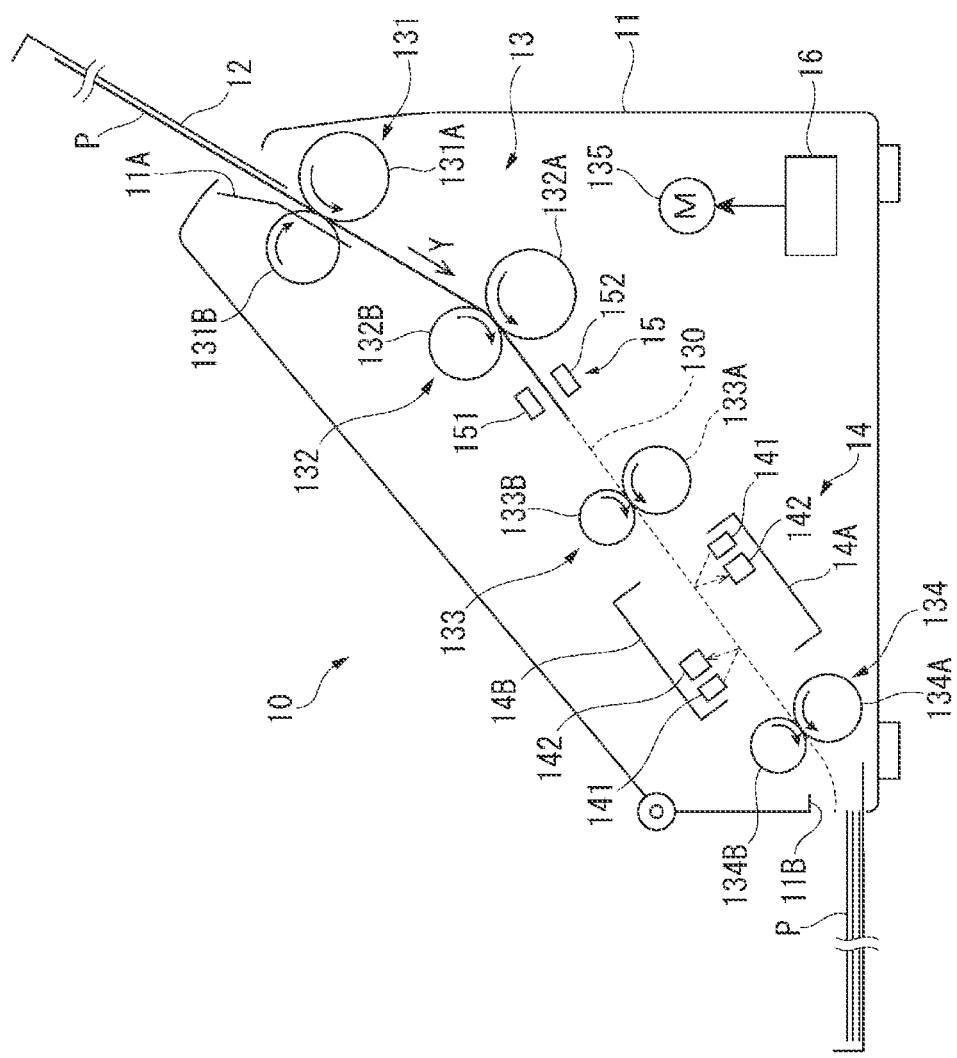
FIG. 2 is a side cross-sectional view schematically showing the image scanner according to the first embodiment.

FIG. 1 is an external view showing a schematic configuration of an image scanner 10 of the present embodiment. FIG. 2 is a side cross-sectional view schematically showing a transport unit of the image scanner 10. FIG. 2 is a side cross-sectional view when the image scanner 10 is viewed from an X direction orthogonal to a transport direction.

Schematic Configuration of Image Scanner 10

As shown in FIG. 1, the image scanner 10 of the present embodiment includes an apparatus main body (hereinafter, abbreviated as a main body 11) and a tray 12 on which a medium P (see FIG. 2) is placed. Inside the main body 11, as shown in FIG. 2, a transport unit 13 that transports the medium P, a scanning unit 14 that reads an image of the transported medium P, an ultrasonic wave sensor 15 that detects multi-feed of the medium P, and a controller 16 that controls the image scanner 10 are provided. As the medium P, for example, various media such as a paper sheet, a film, and a cloth can be used as objects.

As shown in FIGS. 1 and 2, the main body 11 is provided with a feeding port 11A at a coupled position with the tray 12. The medium P placed on the tray 12 is fed one by one to the feeding port 11A. The fed medium P is transported by the transport unit 13 along a predetermined transport path 130 in the main body 11. Then, after an image is read by the scanning unit 14 at a reading position during the transport, the fed medium P is discharged from a discharge port 11B opened at a lower front portion of the main body 11. Further, in the image scanner 10, the transport unit 13 that transports the medium P along the transport path 130, the transport path 130, and the ultrasonic wave sensor 15 constitute a transport apparatus.

Configuration of Transport Unit 13

The transport unit 13 transports, one by one, a plurality of media P loaded (set) on the tray 12 along the transport path 130 in the transport direction. That is, the transport unit 13 feeds the media P fed from the feeding port 11A while guiding the media P into the main body 11, and transports the fed media P along the transport path 130.

More specifically, the transport unit 13 includes a first feeding roller pair 131 disposed upstream in the transport direction of the media P in the main body 11, and a second feeding roller pair 132 disposed downstream of the first feeding roller pair 131 in the transport direction. Further, the transport unit 13 includes a first transport roller pair 133 disposed upstream in the transport direction and a second transport roller pair 134 disposed downstream, with the reading position of the medium P being sandwiched therebetween.

The first feeding roller pair 131 is configured with a first driving roller 131A and a first driven roller 131B. Similarly, the second feeding roller pair 132 is configured with a second driving roller 132A and a second driven roller 132B. Further, the first transport roller pair 133 is configured with a third driving roller 133A and a third driven roller 133B. Similarly, the second transport roller pair 134 is configured with a fourth driving roller 134A and a fourth driven roller 134B. The driven rollers 131B to 134B are driven by rotation of the driving rollers 131A to 134A that form pairs respectively.

The driving rollers 131A to 134A that constitute the respective roller pairs 131 to 134 are rotationally driven by power of a transport motor 135 that is a power source thereof. The transport motor 135 is controlled by the controller 16 and drives the driving rollers 131A to 134A.

Further, the second driven roller 132B that constitutes the second feeding roller pair 132 is a retard roller. A friction coefficient of an outer peripheral surface of the second driven roller 132B with respect to the medium P is larger than a friction coefficient of an outer peripheral surface of the second driving roller 132A with respect to the medium P. Therefore, the second feeding roller pair 132 functions as a separation mechanism that separates the media P one by one and sends the medium P downstream in the transport direction. Therefore, the plurality of media P loaded on the tray 12 are fed sequentially one by one from, for example, a lowest medium, by rotation of the first feeding roller pair 131, into the main body 11 from the feeding port 11A, and are further separated one by one and fed downstream in the transport direction by rotation of the second feeding roller pair 132.

Configuration of Scanning Unit 14

As shown in FIG. 2, a reading position where an image of the medium P is read is provided between the first transport roller pair 133 and the second transport roller pair 134 on the transport path 130, and the scanning unit 14 is provided at the reading position.

The scanning unit 14 includes, for example, a first scanning unit 14A and a second scanning unit 14B provided on both sides that sandwich the transport path 130. The scanning unit 14 is configured with a light source 141 that can irradiate the medium P during transport with light, and an image sensor 142 that extends in a main scanning direction (X direction intersecting the transport direction). In a normal reading mode of reading one side (front surface) of the medium P, the first scanning unit 14A performs a reading operation. In a double-side reading mode of reading both sides (front and back surfaces) of the medium P, the first scanning unit 14A and the second scanning unit 14B both perform the reading operation. The light sources 141 and the image sensors 142 that constitute the scanning unit 14 (14A, 14B) are coupled to the controller 16, and perform a scanning processing of reading the image of the medium P under control of the controller 16.

Configuration of Ultrasonic Wave Sensor 15

The ultrasonic wave sensor 15 is provided, for example, at a position between the second feeding roller pair 132 and the first transport roller pair 133 in the transport direction. The ultrasonic wave sensor 15 is a multi-feed sensor, and detects the multi-feed of the medium P transported by the transport unit 13 along the transport path 130.

Figure 3:
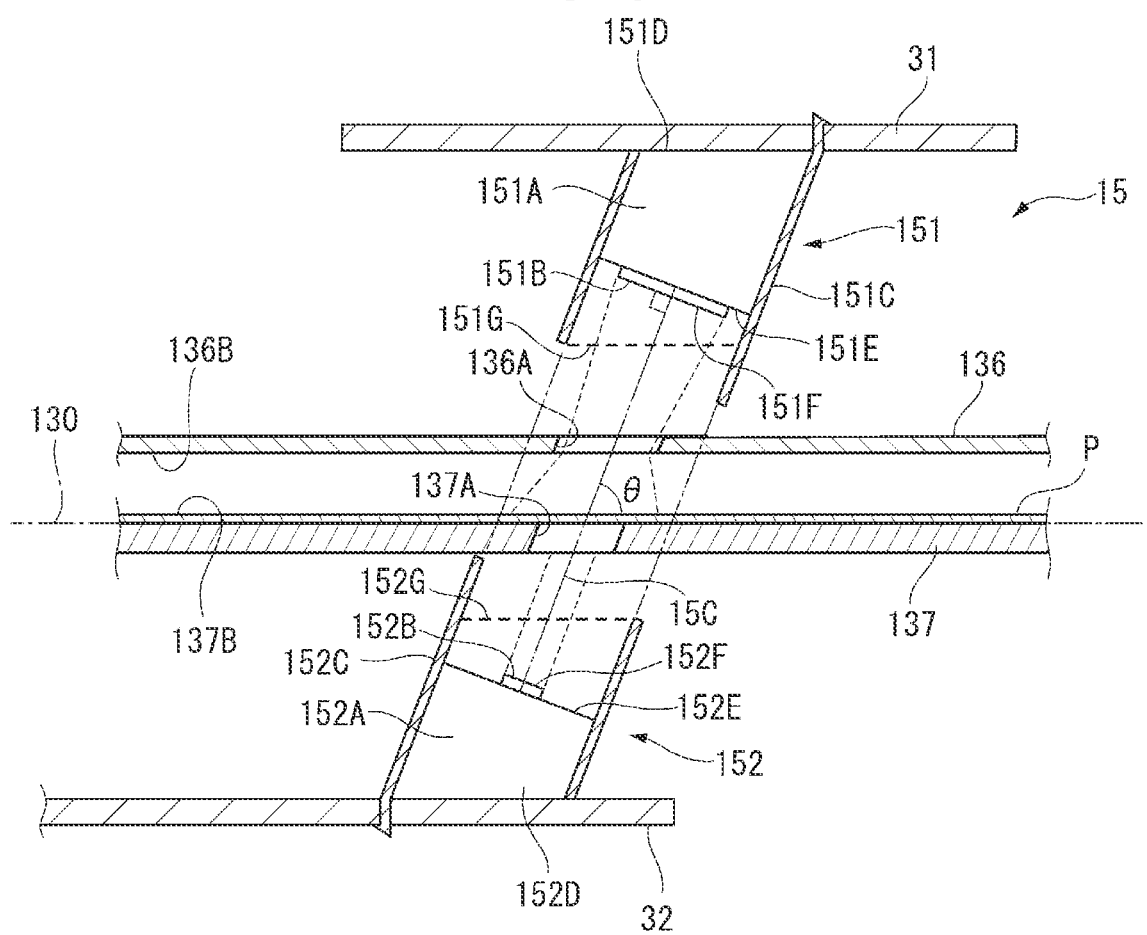
FIG. 3 is a cross-sectional view showing a schematic configuration of an ultrasonic wave sensor.

FIG. 3 is a cross-sectional view showing a schematic configuration of the ultrasonic wave sensor 15. FIG. 3 is a cross-sectional view of the ultrasonic wave sensor 15 when viewed from the transport direction. In the transport direction, a direction at a position where the ultrasonic wave sensor 15 is provided is set as a Y direction.

As shown in FIG. 3, the ultrasonic wave sensor 15 includes a transmitter 151 and a receiver 152. Further, a first guide 136 is provided between the transmitter 151 and the transport path 130, and a second guide 137 is provided between the receiver 152 and the transport path 130. The first guide 136 and the second guide 137 have guide surfaces parallel to the transport path 130, and the medium P is transported along the guide surfaces. That is, the first guide 136 and the second guide 137 form the transport path 130 together with the transport unit 13.

In the ultrasonic wave sensor 15, ultrasonic waves are transmitted from the transmitter 151 to the medium P transported by the transport unit 13. The ultrasonic waves transmitted from the transmitter 151 pass through a first through-hole 136A provided in the first guide 136 and is input to the medium P. The ultrasonic waves transmitted through the medium P pass through a second through-hole 137A of the second guide 137 and are received by the receiver 152. When the ultrasonic waves are received by the receiver 152, a reception signal corresponding to a sound pressure of the received ultrasonic waves is output from the receiver 152, and the multi-feed of the medium P is detected based on a signal intensity of the reception signal. In the following description, the ultrasonic waves transmitted from the transmitter 151 may be referred to as transmission waves, and the ultrasonic waves received by the receiver 152 may be referred to as reception waves.

Here, as shown in FIG. 3, the receiver 152 is disposed on a sound axis 15C of the transmission waves transmitted from the transmitter 151. Further, the transmitter 151 is disposed such that the sound axis 15C is inclined at a predetermined angle $\theta$ (for example, 20°) with respect to a normal line of the transport path 130 and the medium P transported on the transport path 130.

That is, when the sound axis 15C coincides with a normal line direction of a front surface of the medium P, the ultrasonic waves transmitted from the transmitter 151 may be multiple-reflected between the medium P and the transmitter 151. Further, the ultrasonic waves that have passed through the medium P may be multiple-reflected between the receiver 152 and the medium P. In this case, in the receiver 152, in addition to the ultrasonic waves that pass through the medium P from the transmitter 151 and are received by the receiver 152 (ultrasonic waves to be measured), ultrasonic waves due to multiple reflections are also received by the receiver 152, and therefore accurate multi-feed determination cannot be performed.

On the contrary, the sound axis 15C is inclined with respect to the normal line of the front surface of the medium P, so that reception of unnecessary ultrasonic wave components such as multiple-reflected ultrasonic waves in the receiver 152 can be reduced, and highly accurate multi-feed determination is possible.

Configurations of First Guide 136 and Second Guide 137

The first guide 136 and the second guide 137 respectively include a first guide surface 136B and a second guide surface 137B that face the transport path 130, and guide the medium P. In the present embodiment, the second guide surface 137B of the second guide 137 coincides with (or substantially coincides with) the transport path 130. That is, in the present embodiment, the medium P is transported along the second guide surface 137B of the second guide 137.

Further, the first guide 136 includes the first through-hole 136A that penetrates along the sound axis 15C and through which the transmission waves pass.

Similarly, the second guide 137 includes the second through-hole 137A that penetrates along the sound axis 15C and through which the reception waves pass. Detailed description related to opening areas of the first through-hole 136A and the second through-hole 137A will be described later.

Configuration of Transmitter 151

The transmitter 151 includes a transmission pedestal portion 151A, a transmission main body portion 151B, a transmission-side shield 151C, and a transmission circuit substrate 31. The transmission main body portion 151B is fixed to the transmission pedestal portion 151A, and these transmission pedestal portion 151A and transmission main body portion 151B are housed inside the transmission-side shield 151C. Further, the transmission-side shield 151C is fixed to the transmission circuit substrate 31. The transmission circuit substrate 31 is fixed in the main body 11 so as to be parallel to, for example, the transport path 130.

In the transmission pedestal portion 151A, a base-end-side end surface 151D is fixed to the transmission circuit substrate 31, and a tip-end-side end surface 151E on aside opposite to the base-end-side end surface 151D is inclined at an angle $\theta$ with respect to the base-end-side end surface 151D. The transmission main body portion 151B is fixed to the tip-end-side end surface 151E, so that a transmission surface 151F of the ultrasonic waves of the transmitter 151 is fixed at an angle orthogonal to the sound axis 15C.

The transmission-side shield 151C is formed in a tubular shape such as a cylindrical shape or a rectangular tubular shape, and the transmission pedestal portion 151A and the transmission main body portion 151B are inserted and housed inside the transmission-side shield 151C. The transmission-side shield 151C is formed of an electrically conductive material such as metal and prevents static electricity and electromagnetic wave noise.

Further, a tubular end surface of the transmission-side shield 151C that faces the transport path 130 is an opening end, and the transmission waves from the transmission main body portion 151B can pass therethrough. Furthermore, a first protective member 151G provided with a large number of hole portions through which the ultrasonic waves pass may be provided between the opening end of the transmission-side shield 151C and the transmission main body portion 151B. As such a first protective member 151G, for example, a metal mesh or the like can be exemplified. The first protective member 151G is provided, so that entry of a foreign matter into the transmission-side shield 151C can be prevented.

Further, the other end of the transmission-side shield 151C on a side opposite to the opening end is fixed to the transmission circuit substrate 31.

In the present embodiment, a configuration in which the transmission-side shield 151C is fixed to the transmission circuit substrate 31 and the transmission pedestal portion 151A and the transmission main body portion 151B are housed in the transmission-side shield 151C is exemplified, and the present disclosure is not limited thereto. For example, the transmission pedestal portion 151A, the transmission main body portion 151B, and the transmission circuit substrate 31 may be housed in the transmission-side shield 151C. In this case, the transmission-side shield 151C may be fixed to a predetermined position that faces the first through-hole 136A in the main body 11.

The receiver 152 has a configuration substantially similar to that of the transmitter 151. That is, the receiver 152 includes a reception pedestal portion 152A, a reception main body portion 152B, and a reception-side shield 152C, and is fixed to a reception circuit substrate 32. The reception circuit substrate 32 is fixed in the main body 11 in parallel to, for example, the transport path 130.

In the reception pedestal portion 152A, a base-end-side end surface 152D is fixed to the reception circuit substrate 32, and a tip-end-side end surface 152E on a side opposite to the base-end-side end surface 152D is inclined at an angle $\theta$ with respect to the base-end-side end surface 152D. The reception main body portion 152B is fixed to the tip-end-side end surface 152E, so that a reception surface 152F of ultrasonic waves of the receiver 152 is fixed at an angle orthogonal to the sound axis 15C.

The reception-side shield 152C is formed in a tubular shape such as a cylindrical shape or a rectangular tubular shape, and the reception pedestal portion 152A and the reception main body portion 152B are housed inside. The reception-side shield 152C is formed of an electrically conductive material such as metal and prevents static electricity and electromagnetic wave noise.

A tubular end surface of the reception-side shield 152C that faces the transport path 130 is an opening end, and reception waves from the medium P can pass therethrough. Further, a second protective member 152G provided with a large number of hole portions through which the ultrasonic waves pass may be provided between the opening end of the reception-side shield 152C and the reception main body portion 152B. As such a second protective member 152G, for example, a metal mesh or the like can be exemplified. The protective member is provided, so that entry of a foreign matter into the reception-side shield 152C can be prevented.

The other end of the reception-side shield 152C on a side opposite to the opening end is fixed to the reception circuit substrate 32.

In the present embodiment, a configuration in which the reception-side shield 152C is fixed to the reception circuit substrate 32 and the reception pedestal portion 152A and the reception main body portion 152B are housed in the reception-side shield 152C is exemplified, and the present disclosure is not limited thereto. For example, the reception pedestal portion 152A, the reception main body portion 152B, and the reception circuit substrate 32 may be housed in the reception-side shield 152C. In this case, the reception-side shield 152C may be fixed to a predetermined position that faces the second through-hole 137A in the main body 11.

In the present embodiment, an example in which the transmission circuit substrate 31 and the reception circuit substrate 32 are provided independently is shown, and the present disclosure is not limited thereto. The transmission circuit substrate 31 and the reception circuit substrate 32 may be integrally provided on one substrate. Further, at least one of the transmission circuit substrate 31 and the reception circuit substrate 32 may be configured with a plurality of substrates.

Element Configuration of Transmitter 151

Next, the transmission main body portion 151B that constitutes the transmitter 151 will be described in more detail. The reception main body portion 152B has a configuration similar to that of the transmission main body portion 151B. Therefore, a detailed configuration of the reception main body portion 152B will be omitted.

FIG. 4 is a cross-sectional view showing a schematic configuration of a part of the transmission main body portion 151B.

As shown in FIG. 4, the transmission main body portion 151B includes an element substrate 21 and piezoelectric elements 22. In the present embodiment, a substrate thickness direction (Z direction) of the element substrate 21 coincides with or substantially coincides with the sound axis 15C.

As shown in FIG. 4, the transmission main body portion 151B includes the element substrate 21 and the piezoelectric elements 22.

The element substrate 21 includes a substrate main body portion 211 and a vibration plate 212 provided on one surface side of the substrate main body portion 211. Here, in the following description, the substrate thickness direction of the element substrate 21 is set as the Z direction. The Z direction is a direction in which the ultrasonic waves are transmitted, and is parallel to the sound axis 15C.

The substrate main body portion 211 is a substrate that supports the vibration plate 212, and is configured with a semiconductor substrate such as Si. The substrate main body portion 211 is provided with opening portions 211A each of which penetrates the substrate main body portion 211 along the Z direction.

The vibration plate 212 is configured with a laminated body of $SiO_2$, or $SiO_2$ and $ZrO_2$, and the like, and is provided on a −Z side of the substrate main body portion 211. The vibration plate 212 is supported by partition walls 211B of the substrate main body portion 211 that constitute the opening portions 211A, and closes the −Z side of the opening portions 211A. A portion of the vibration plate 212 that overlaps an opening portion 211A when viewed from the Z direction constitutes a vibration portion 212A.

The piezoelectric elements 22 are provided on the vibration plate 212 at positions that overlap respective vibration portions 212A when viewed from the Z direction. As shown in FIG. 4, the piezoelectric element 22 is configured by sequentially laminating a first electrode 221, a piezoelectric film 222, and a second electrode 223 on the vibration plate 212.

Here, one vibration portion 212A and a piezoelectric element 22 provided on the vibration portion 212A constitute one ultrasonic wave transducer Tr. Although illustration is omitted, in the present embodiment, by disposing such an ultrasonic wave transducer Tr in a two-dimensional array structure, the transmission main body portion 151B is configured.

In the transmission main body portion 151B, a pulse wave voltage having a predetermined frequency is applied between the first electrode 221 and the second electrode 223 of each ultrasonic wave transducer Tr, so that the piezoelectric film 222 expands and contracts. Accordingly, the vibration portion 212A vibrates at a frequency corresponding to an opening width of the opening portion 211A, and the ultrasonic waves are transmitted from the vibration portion 212A toward a +Z side. That is, a +Z side surface of the element substrate 21 is the transmission surface 151F of the ultrasonic waves of the transmitter 151.

As described above, the reception main body portion 152B has a configuration similar to that of the transmission main body portion 151B, and has a configuration in which the transmission main body portion 151B shown in FIG. 4 is turned upside down. That is, in the reception main body portion 152B, the vibration plate 212 is disposed on a +Z side of the substrate main body portion 211, and the piezoelectric elements 22 are arranged on the +Z side of the vibration plate 212. Therefore, in the reception main body portion 152B, a −Z side surface of the element substrate 21 on which no vibration plate 212 is provided is the reception surface 152F, and receives ultrasonic waves input from the −Z side toward the +Z side. In the reception main body portion 152B, when the ultrasonic waves are received from the opening portions 211A, the vibration portions 212A vibrate. Accordingly, a potential difference is generated between a first electrode 221 side and a second electrode 223 side of the piezoelectric film 222, and a reception signal corresponding to the potential difference is output from the reception main body portion 152B.

Position and Opening Area of First Through-Hole 136A

Next, the position and the opening area of the first through-hole 136A with respect to the transmitter 151 will be described.

Figure 5:
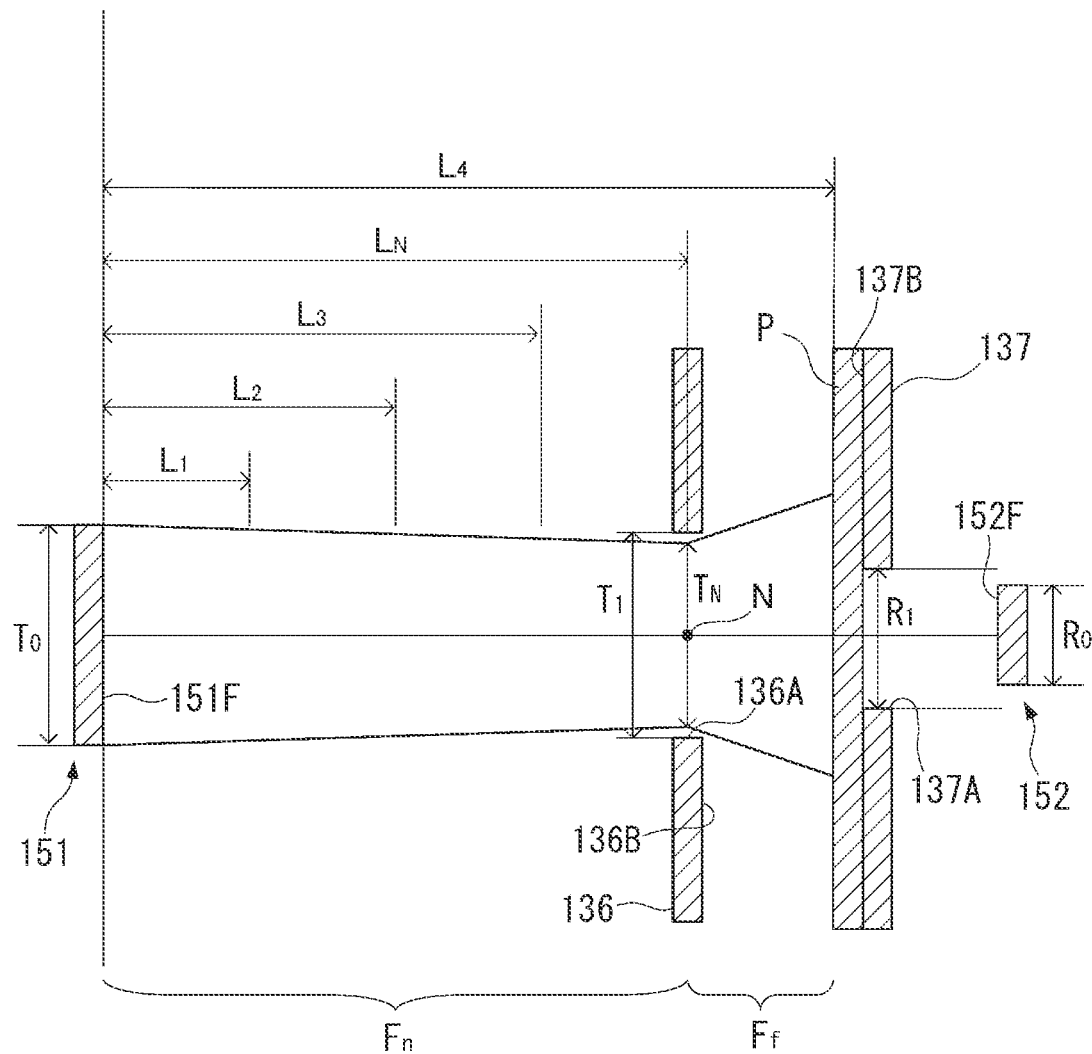
FIG. 5 is a diagram illustrating a beam shape of transmission waves and positions of a transmitter, a receiver, a first through-hole, and a second through-hole.

FIG. 5 is a diagram for illustrating a beam shape of the transmission waves and a positional relationship between the transmitter 151, the receiver 152, the first through-hole 136A, and the second through-hole 137A.

Figure 6:
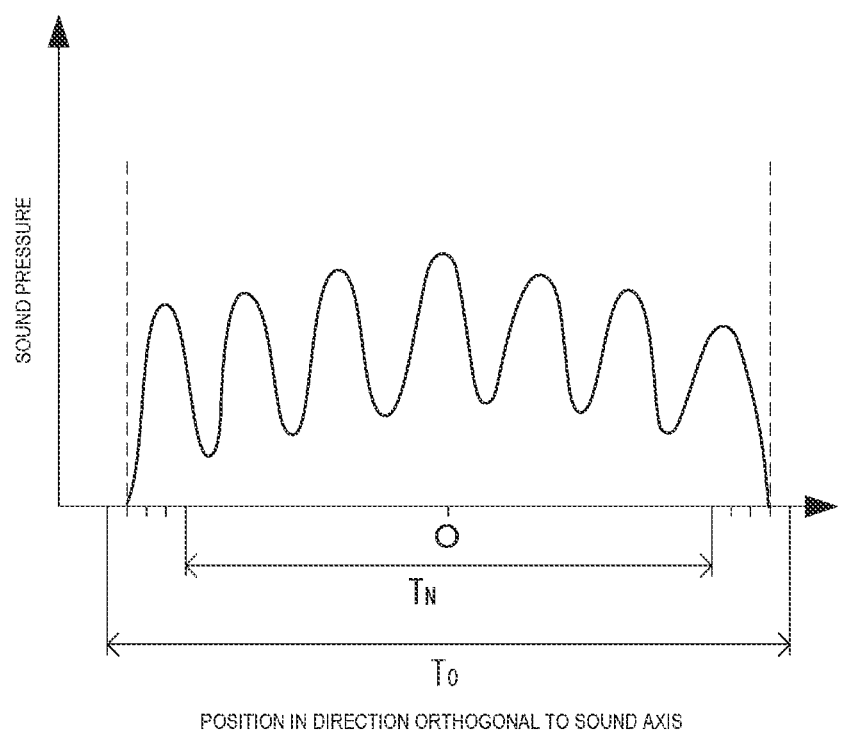
FIG. 6 is a diagram showing a sound pressure distribution at a position where a distance from a transmission surface is $L_1$ in a short-distance sound field.
Figure 7:
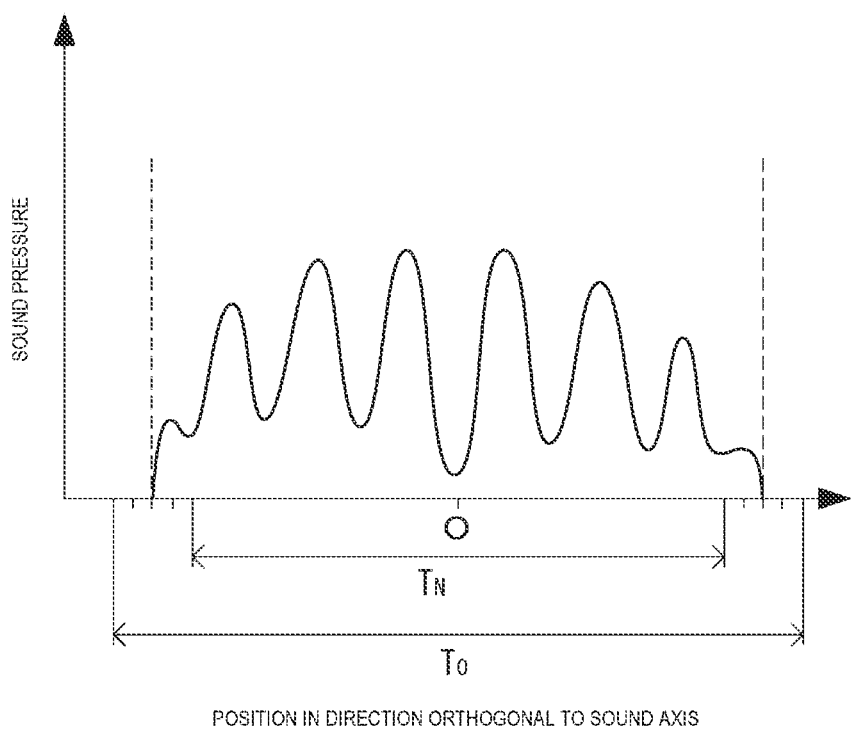
FIG. 7 is a diagram showing a sound pressure distribution at a position where a distance from the transmission surface is $L_2$ in the short-distance sound field.
Figure 8:
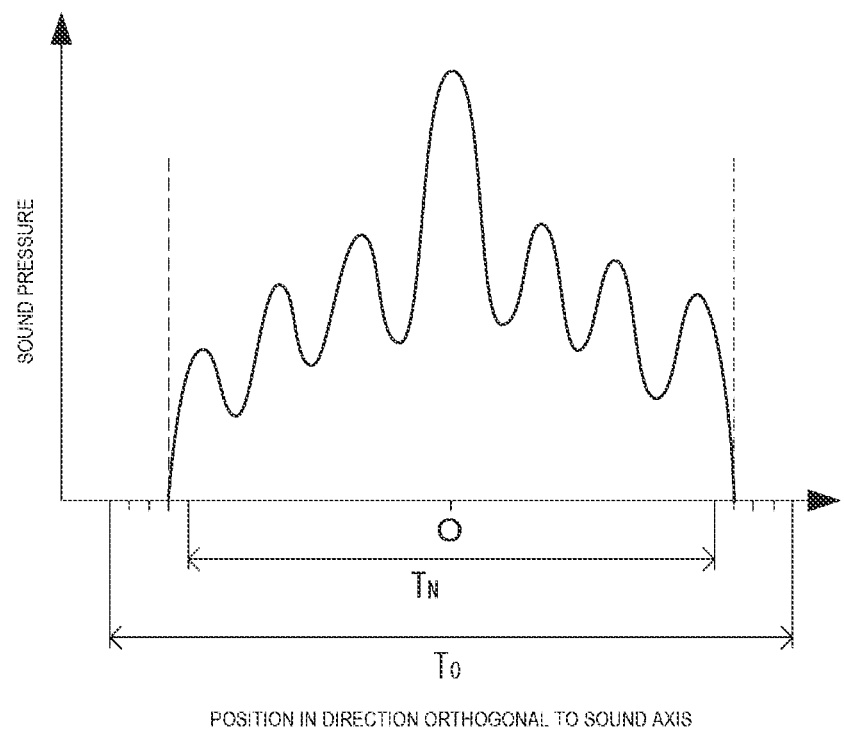
FIG. 8 is a diagram showing a sound pressure distribution at a position where a distance from the transmission surface is $L_3$ in the short-distance sound field.
Figure 9:
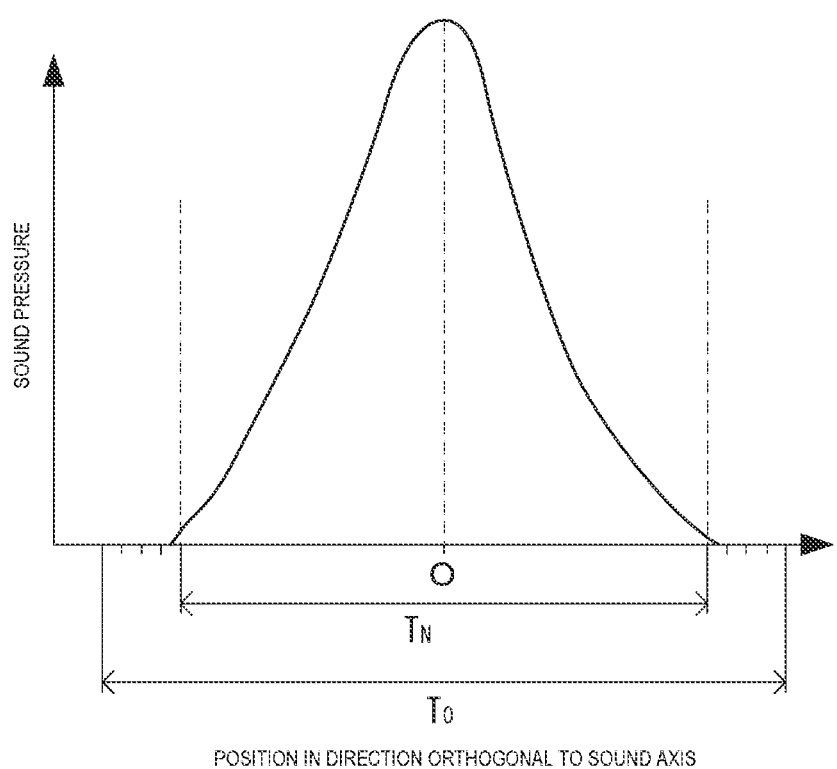
FIG. 9 is a diagram showing a sound pressure distribution at a position where a distance from the transmission surface is a short-distance sound field limit distance $L_N$.
Figure 10:
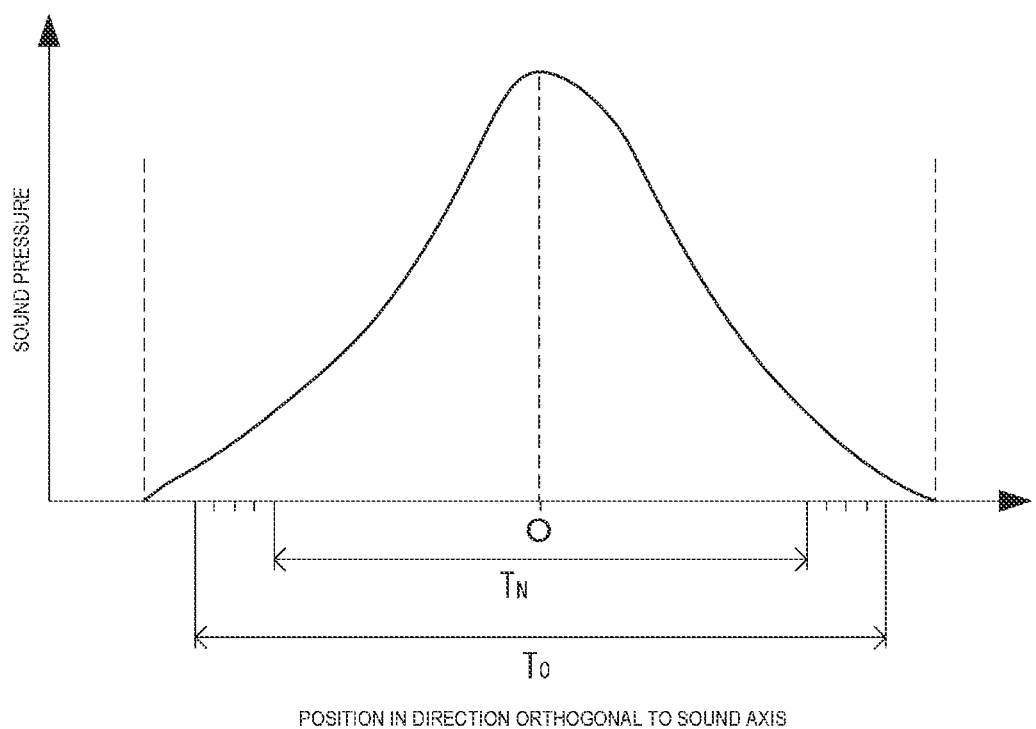
FIG. 10 is a diagram showing a sound pressure distribution at a position where a distance from the transmission surface is a distance $L_4$ of a long-distance sound field.
Figure 11:
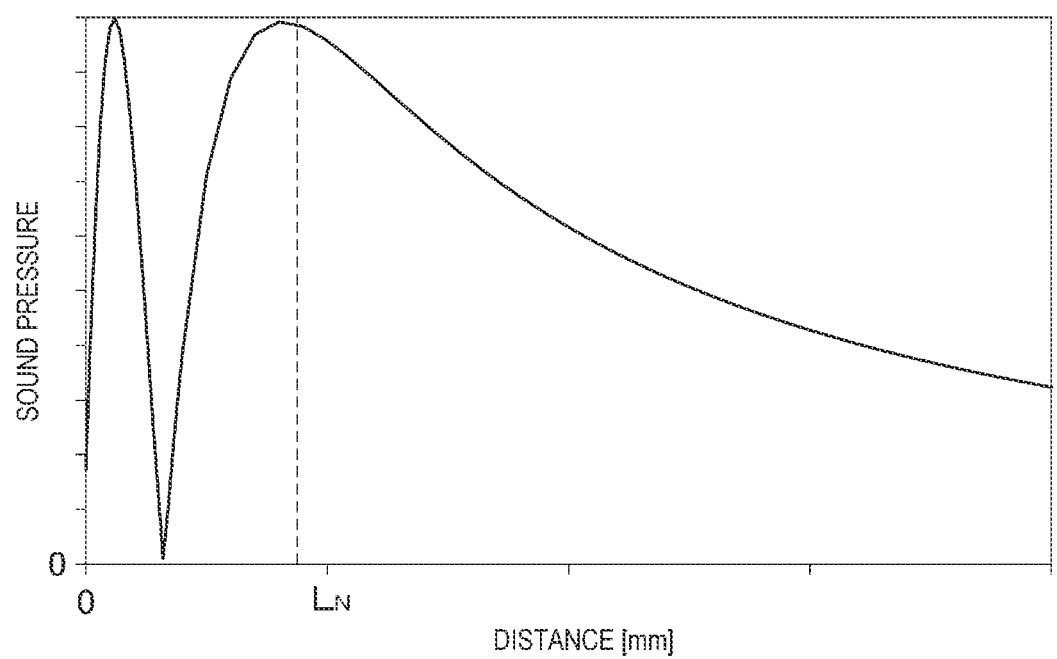
FIG. 11 is a diagram showing a magnitude of a sound pressure along a sound axis of the transmission waves.

FIG. 6 is a diagram showing a sound pressure distribution along one direction orthogonal to the sound axis 15C at a position where a distance from the transmission surface 151F is a distance $L_1$ in a short-distance sound field. FIG. 7 is a diagram showing a sound pressure distribution at a position where a distance from the transmission surface 151F is a distance $L_2$ in the short-distance sound field. FIG. 8 is a diagram showing a sound pressure distribution at a position where a distance from the transmission surface 151F is a distance $L_3$ in the short-distance sound field. FIG. 9 is a diagram showing a sound pressure distribution at a position where a distance from the transmission surface 151F is a short-distance sound field limit distance $L_N$. FIG. 10 is a diagram showing a sound pressure distribution at a position where a distance from the transmission surface 151F is a distance $L_4$ by which the medium P is disposed. FIG. 11 is a diagram showing a magnitude of a sound pressure along the sound axis 15C of the transmission waves.

As shown in FIG. 5, the transmission waves transmitted from the transmitter 151 have a beam shape including a part in a short-distance sound field $F_n$ in which a distance from the transmission surface 151F is less than the short-distance sound field limit distance $L_N$ and a part in a long-distance sound field $F_f$ in which the distance is equal to or larger than the short-distance sound field limit distance $L_N$.

In the short-distance sound field $F_n$, the transmission waves are propagated as plane waves. That is, when spherical waves are transmitted from the ultrasonic wave transducers Tr of the transmission main body portion 151B, these spherical waves are combined so as to form the plane waves, and the plane waves are propagated in air along the sound axis 15C. Therefore, in the short-distance sound field $F_n$, a place where the spherical waves are strengthened each other and a place where the spherical waves are weakened each other coexist. Accordingly, as shown in FIGS. 6 to 8, a sound pressure distribution in a beam cross-section orthogonal to the sound axis 15C becomes complicated, and the distribution varies depending on the distance from the transmission surface 151F. On the other hand, beyond the short-distance sound field limit distance $L_N$, as shown in FIGS. 9 and 10, a sound pressure on the sound axis 15C reaches a peak, and the sound pressure has a distribution in accordance with a Cauchy distribution in which the sound pressure decreases as the distance from the sound axis 15C is increased. That is, the sound pressure distribution has a simple shape in the long-distance sound field $F_f$.

When the medium P is positioned in the short-distance sound field $F_n$, the sound pressure distribution input to the medium P is complicated, and therefore, the complicated sound pressure distribution remains even in the reception waves propagated from the medium P toward the receiver 152. That is, when transmission waves in which a portion having a high sound pressure and a portion having a low sound pressure coexist are input to the medium P, a portion of the medium P to which transmission waves having a high sound pressure are input vibrates largely, and spherical waves corresponding to the vibration are transmitted toward the receiver 152. Therefore, since spherical waves emitted from a portion of the medium P having a high sound pressure strengthen each other or weaken each other, a sound pressure distribution is formed in which a portion having a high sound pressure and a portion having a low sound pressure coexist.

Here, in order to detect multi-feed based on a signal voltage of a reception signal, it is necessary to determine whether a signal value of the reception signal is equal to or smaller than a threshold. When the mutually strengthened ultrasonic waves are input to the receiver 152, even though the medium P is multi-fed, a reception signal having a signal value that is larger than a threshold may be output. Further, when the mutually weakened ultrasonic waves are input to the receiver 152, even though the medium P is not multi-fed, a reception signal having a signal value that is equal to or smaller than the threshold may be input.

On the contrary, in the present embodiment, a distance between the transmitter 151 and the first through-hole 136A of the first guide 136 is the short-distance sound field limit distance $L_N$. Specifically, a length of a line segment that couples a center point of the transmission surface 151F and an opening center point of the first through-hole 136A is the short-distance sound field limit distance $L_N$. Since the transport path 130 is positioned closer to a receiver 152 side than the first through-hole 136A, the medium P transported along the transport path 130 is positioned in the long-distance sound field $F_f$.

Accordingly, in the present embodiment, transmission waves having a sound pressure distribution substantially in accordance with the Cauchy distribution are input to the medium P around the sound axis 15C. Therefore, the sound pressure of the reception waves is also the highest on the sound axis 15C. In this case, since the receiver 152 outputs a reception signal corresponding to the reception waves on the sound axis 15C whose sound pressure reaches a peak value, a noise component described above can be reduced, and accuracy of multi-feed detection can be improved.

When the multi-feed of the medium P is detected by the ultrasonic wave sensor 15, it is necessary to sufficiently increase a sound pressure of the reception waves in order to improve an S/N ratio of the reception signal. Therefore, it is preferable that the transmission waves output from the transmitter 151 reach the medium P without being blocked by the first guide 136. That is, it is preferable that the first through-hole 136A has a sufficient opening area such that the transmission waves can pass through. However, when the opening area of the first through-hole 136A is increased, the medium P transported along the transport path 130 may be caught in the first through-hole 136A, a wrinkle may occur on the medium P, or the medium P may be jammed in the transport path 130. Therefore, it is necessary for the first through-hole 136A to be formed in an opening area that prevents the medium P from being caught and that does not block the transmission waves.

Figure 12:
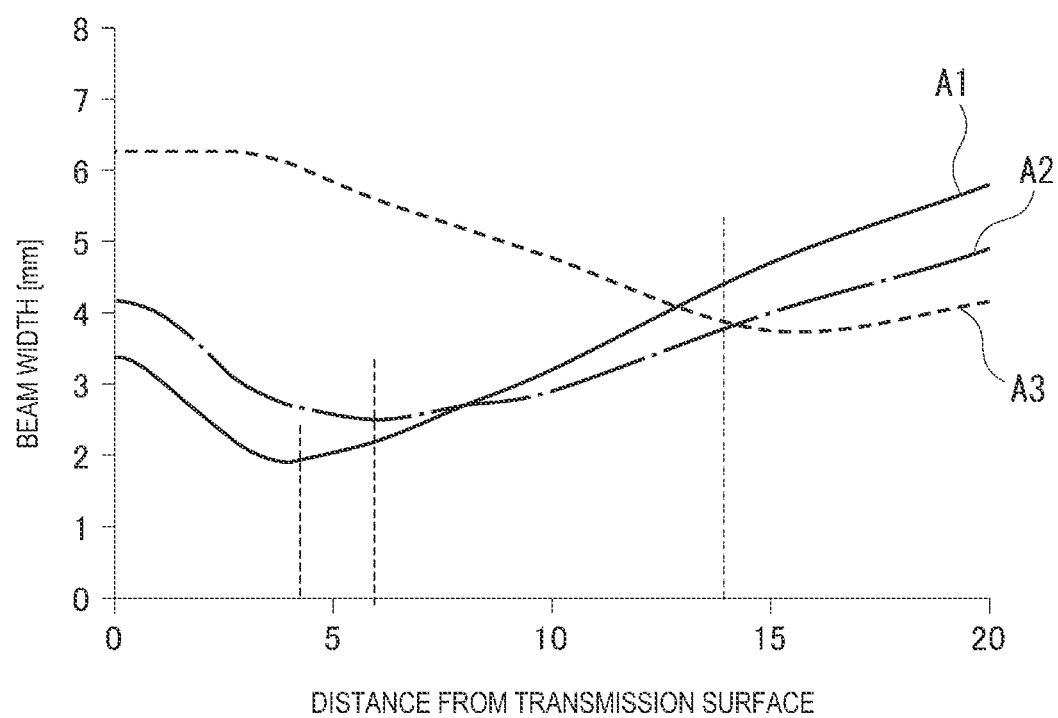
FIG. 12 is a diagram showing a relationship between a distance from the transmission surface and a beam diameter of the transmission waves for each of cases where a projection area of the transmission surface is changed.

FIG. 12 is a diagram showing a relationship between a distance from the transmission surface 151F and a beam diameter of the transmission waves for each of cases where a projection area of a projection image obtained by projecting the transmission surface 151F on the first guide surface 136B is changed. In FIG. 12, data A1 indicates a change in the beam diameter when the transmission surface 151F has a circular shape with a diameter of 3.5 mm, and the short-distance sound field limit distance is 4.3 mm. Data A2 indicates a change in the beam diameter when the transmission surface 151F has a circular shape with a diameter of 4.2 mm, and the short-distance sound field limit distance is 6.2 mm. Data A3 indicates a change in the beam diameter when the transmission surface 151F has a circular shape with a diameter of 6.3 mm, and the short-distance sound field limit distance is 13.9 mm.

As shown in FIG. 12, the beam shape of the transmission waves is formed such that, the beam diameter decreases as a distance from the transmission surface 151F increases, between the transmission surface 151F and the short-distance sound field limit distance $L_N$. Further, when a distance from the transmission surface 151F is larger than the short-distance sound field limit distance $L_N$, the beam diameter increases around the sound axis 15C.

Here, when a projection area when the transmission surface 151F is projected on the first guide surface 136B along the sound axis 15C is set as $T_0$ and the opening area of the first through-hole 136A is set as $T_1$, it is preferable that $T_0 \geq T_1$.

Further, the opening area $T_1$ of the first through-hole 136A may cause the transmission waves in the vicinity of the short-distance sound field limit distance $L_N$ to pass. Therefore, when a cross-sectional area of a portion of an ultrasonic wave beam of the transmission waves that passes through the first through-hole 136A is set as $T_N$, it is more preferable that $T_1 \geq T_N$. The cross-sectional area $T_N$ is an area of a beam cross-section of the ultrasonic wave beam on a plane that includes an opening center point N of the first through-hole 136A and is parallel to the first guide surface 136B, and the opening center point N is set as a point where a distance from a center point of the transmission surface 151F along the sound axis 15C is the short-distance sound field limit distance $L_N$.

When the opening area $T_1$ of the first through-hole 136A satisfies $T_1 \geq T_N$, a decrease in the sound pressure due to the transmission waves being blocked by the first guide 136 can be prevented.

When the ultrasonic wave sensor 15 is fixed to the main body 11, $T_1 = T_N$ can be set when the transmitter 151 can be strictly aligned with the first through-hole 136A. In this case, the opening area $T_1$ of the first through-hole 136A is minimized, and the medium P can be further prevented from being caught in the first through-hole 136A. However, when there is a slight positional displacement during alignment adjustment when fixing the transmitter 151, the transmission waves may be blocked by the first guide 136. Therefore, $T_0 \geq T_1 \gg T_N$ may be set in consideration of a certain margin. Accordingly, a decrease in the sound pressure of the transmission waves due to the positional displacement of the transmission surface 151F with respect to the first through-hole 136A can be prevented.

Further, as an area of the transmission surface 151F becomes smaller, the short-distance sound field limit distance $L_N$ also becomes smaller. Therefore, when the area of the transmission surface 151F is sufficiently small, $T_1 \approx T_0$ may be set.

Position and Opening Area of Second Through-Hole 137A

Next, the position and the opening area of the second through-hole 137A with respect to the receiver 152 will be described.

Since the reception waves received by the receiver 152 are the ultrasonic waves that have passed through the medium P, a sound pressure thereof is much smaller than that of the transmission waves transmitted by the transmitter 151. Therefore, the reception surface 152F of the receiver 152 is preferably disposed close to the medium P. For example, in the present embodiment, a distance between the second through-hole 137A and the reception surface 152F is smaller than a distance between the first through-hole 136A and the transmission surface 151F (the short-distance sound field limit distance $L_N$).

$R_0 < T_N$, wherein $R_0$ is a projection area of a projection image when the reception surface 152F is projected on the second guide surface 137B along the sound axis 15C. That is, in the present embodiment, as described above, since the medium P transported on the transport path 130 is positioned in the long-distance sound field $F_f$ based on the ultrasonic waves of the transmitter 151, the ultrasonic waves whose sound pressure reaches a peak at the position of the sound axis 15C are input to the medium P. In this case, the reception waves propagated from the medium P toward the receiver 152 also have a sound pressure distribution in accordance with the Cauchy distribution in which the sound pressure on the sound axis 15C reaches a peak. Therefore, the receiver 152 only needs to be able to measure a sound pressure in the vicinity of the sound axis 15C. On the other hand, at a position away from the sound axis 15C, a noise component such as a multiple reflection component of the ultrasonic waves is increased.

In the present embodiment, by setting $R_0 < T_N$, the reception waves in the vicinity of the sound axis 15C is detected. Accordingly, a noise component included in a reception signal can be reduced.

Further, in the present embodiment, $T_1 > R_1 > R_0$, wherein $R_1$ is the opening area of the second through-hole 137A.

Figure 13:
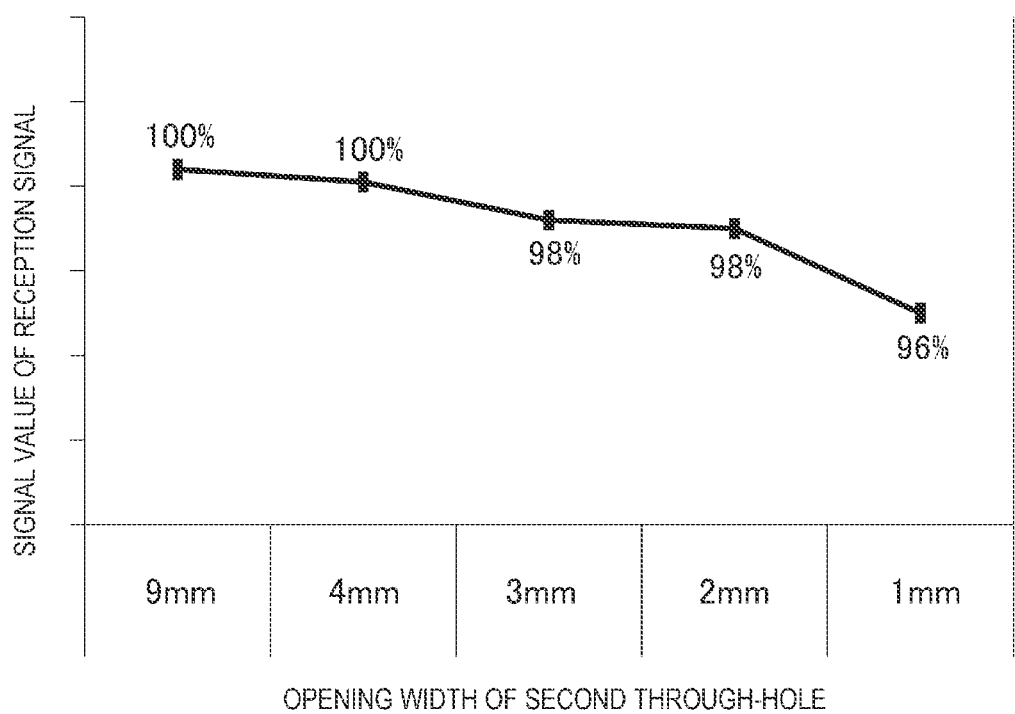
FIG. 13 is a diagram showing a signal value of a reception signal from the receiver when an opening area of the second through-hole is changed with respect to a projection area of the receiver.

FIG. 13 is a diagram showing a signal value of a reception signal from the reception surface 152F when the opening area $R_1$ of the second through-hole 137A is changed with respect to the projection area $R_0$ of the reception surface 152F. Specifically, reception signals in cases where a length of one side of the square second through-hole 137A is set to 1 mm, 2 mm, 3 mm, 4 mm, and 9 mm with respect to the square reception surface 152F having one side of 1 mm are shown.

When the length of one side of the second through-hole 137A is set to 4 mm or 9 mm, the signal value of the reception signal is sufficiently large. On the contrary, when the length of one side of the second through-hole 137A is set to 3 mm or 2 mm, the signal value of the reception signal is slightly reduced. Further, when the length of one side of the second through-hole 137A is set to 1 mm, which is the same as that of the reception surface 152F, the signal value of the reception signal is further reduced, which indicates that the reception signal is reduced due to a slight alignment displacement in a position of the reception surface 152F with respect to the second through-hole 137A.

Even when $R_1 = R_0$, when the position of the reception surface 152F with respect to the second through-hole 137A is strictly adjusted, a decrease in the signal value of the reception signal can be prevented. However, in order to perform such alignment adjustment with high accuracy is required, which leads to a decrease in manufacturing efficiency and a rise in a manufacturing cost. On the contrary, by setting $R_1 > R_0$ as described above, a reception signal having an appropriate signal value can be received without leading to the decrease in the manufacturing efficiency and the rise in the manufacturing cost.

In a case of $R_1 < R_0$, since the receiver 152 cannot receive sufficient ultrasonic waves, the reception signal is reduced and accuracy of the multi-feed determination is adversely influenced.

Further, in the present embodiment, $T_1 > R_1$. Therefore, a disadvantage that the medium P is caught in the second through-hole 137A can be prevented.

Circuit Configuration of Ultrasonic Wave Sensor 15

Figure 14:
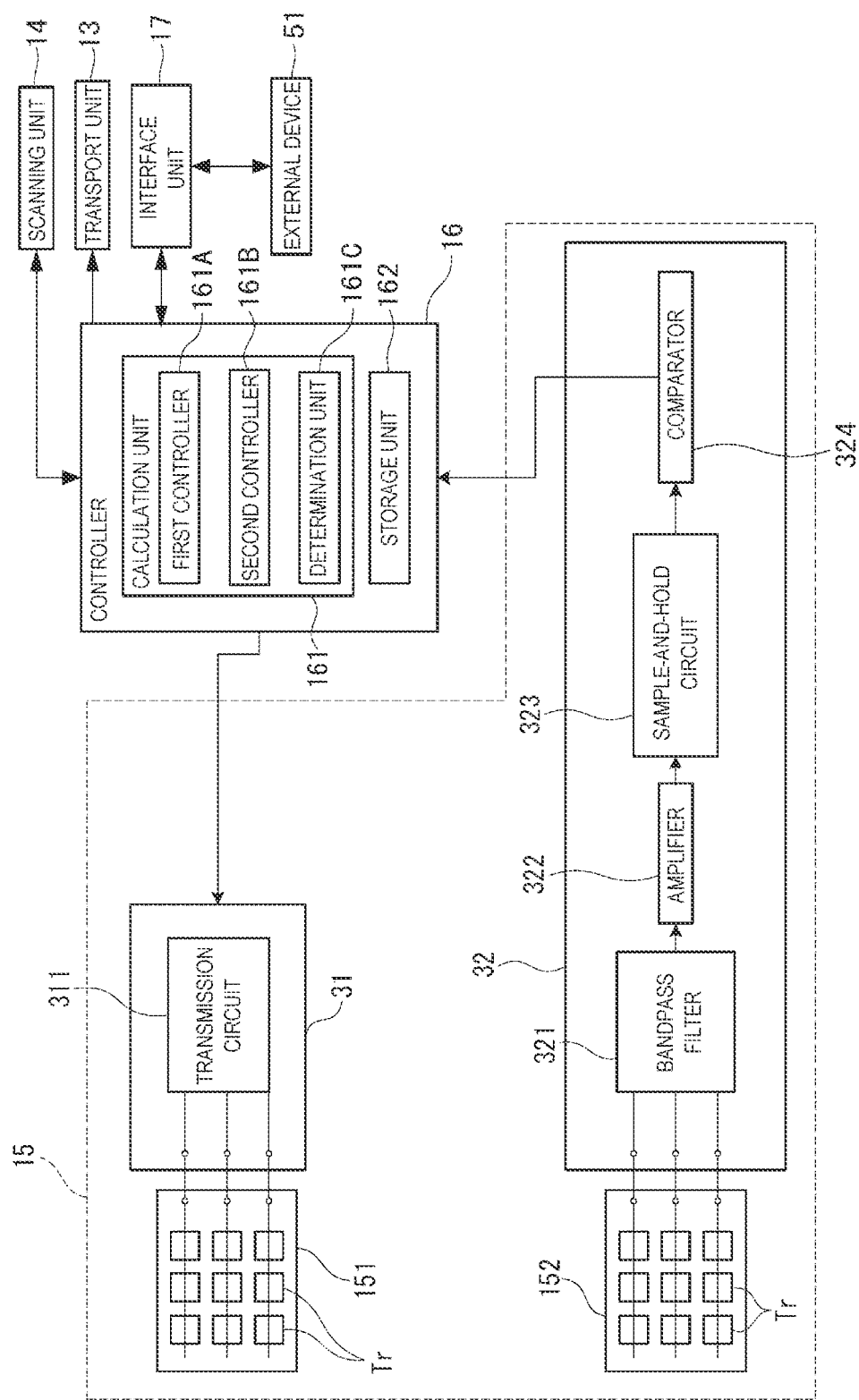
FIG. 14 is a block diagram showing a control configuration of the image scanner.

FIG. 14 is a block diagram showing a control configuration of the image scanner 10.

In the present embodiment, as a circuit configuration of the ultrasonic wave sensor 15, a transmission control circuit that controls driving of the transmitter 151 is provided on the transmission circuit substrate 31, and a reception processing circuit that controls driving of the receiver 152 is provided on the reception circuit substrate 32. The circuit configuration of the ultrasonic wave sensor 15 is not limited thereto. As described above, a circuit configuration that controls the receiver 152 may be integrally provided on the transmission circuit substrate 31, and a circuit configuration that controls the transmitter 151 may be integrally provided on the reception circuit substrate 32. Further, these circuit configurations may be configured with a plurality of circuit substrates.

In the present embodiment, as shown in FIG. 14, a transmission circuit 311 is provided on the transmission circuit substrate 31.

The transmission circuit 311 is electrically coupled to the ultrasonic wave transducers Tr of the transmitter 151, and generates a driving signal that drives the ultrasonic wave transducers Tr.

The reception circuit substrate 32 is provided with a reception circuit that processes a reception signal so as to output the processed reception signal to the controller 16, and the like. As the reception circuit, a general circuit that processes a reception signal input by receiving the ultrasonic waves can be used. As shown in FIG. 14, the reception circuit can be configured with a bandpass filter 321, an amplifier 322, a sample-and-hold circuit 323, a comparator 324, and the like.

A reception signal output from the receiver 152 is input to the bandpass filter 321. A noise component or the like in the reception signal is removed by the bandpass filter 321, the reception signal is amplified by the amplifier 322 so as to have a predetermined signal intensity or higher, and the amplified reception signal is input to the sample-and-hold circuit 323. The sample-and-hold circuit 323 samples the reception signal at a predetermined frequency, and the sampled reception signal is input to the comparator 324. The comparator 324 detects a reception signal whose signal intensity is larger than a predetermined threshold from the sampled reception signals, and inputs the detected reception signal to the controller 16.

Configuration of Controller 16

As shown in FIG. 14, the controller 16 includes a calculation unit 161 configured with a central processing unit (CPU) and the like, and a storage unit 162 configured with a recording circuit such as a memory.

The controller 16 is coupled to the transport motor 135 of the transport unit 13, the scanning unit 14, and the ultrasonic wave sensor 15, and controls driving of the transport motor 135, the scanning unit 14, and the ultrasonic wave sensor 15. Further, the controller 16 is coupled to an interface unit 17, receives various data and signals input from an external device such as a personal computer, and outputs read data read by the image scanner 10 to the external device.

The storage unit 162 records various data and various programs for controlling the image scanner 10.

The calculation unit 161 functions as a first controller 161A, a second controller 161B, the determination unit 161C, and the like as shown in FIG. 14 by reading and executing the various programs stored in the storage unit 162.

The first controller 161A controls the transport motor 135 of the transport unit 13 to rotate the plurality of roller pairs 131 to 134, so that the media P set on the tray 12 are fed one by one into the main body 11. Further, the first controller 161A causes the fed medium P to be transported along the transport path 130.

The second controller 161B controls the scanning unit 14 to read the image of the medium P while the medium P is transported.

The determination unit 161C is a state detection unit that detects a state of the medium P. In the present embodiment, the determination unit 161C controls the ultrasonic wave sensor 15 and determines the multi-feed of the medium P based on a reception signal received from the receiver 152.

Specifically, when a voltage value of the reception signal is smaller than a predetermined threshold, it is determined that the medium P is multi-fed. When the determination unit 161C determines that the multi-feed has occurred, the first controller 161A stops the transport of the medium P.

Function and Effects of Present Embodiment

The image scanner 10 of the present embodiment includes the transport path 130 on which the medium P is transported, the transmitter 151 that transmits the transmission waves to the medium P transported on the transport path 130, and the receiver 152 that receives the reception waves from the medium P. The transport path 130 is provided between the transmitter 151 and the receiver 152, and the transport path 130 is provided in the long-distance sound field $F_f$ of the ultrasonic waves transmitted from the transmitter 151.

Therefore, the sound pressure distribution of the transmission waves input to the medium P is a distribution in accordance with the Cauchy distribution in which the sound pressure on the sound axis 15C reaches a peak. Therefore, the reception waves that pass through the medium P also have a sound pressure distribution in accordance with the Cauchy distribution in which the sound pressure on the sound axis 15C reaches a peak, and the noise component included in the reception signal can be prevented. Therefore, the multi-feed and a thickness of the medium can be accurately detected based on the reception signal from the receiver.

In the present embodiment, the first guide 136 provided between the transport path 130 and the transmitter 151, and the second guide 137 provided between the transport path 130 and the receiver 152 are provided. Further, the first guide 136 includes the first through-hole 136A that causes the transmission waves to pass therethrough toward the medium P, and the second guide 137 includes the second through-hole 137A that causes the reception waves from the medium P to pass therethrough toward the receiver 152.

Accordingly, since the medium P is guided and transported by the first guide 136 and the second guide 137, it is possible to prevent the medium P from interfering with other members in the main body 11 while the medium P is transported. Therefore, a disadvantage that a wrinkle occurs on the medium P or a jam occurs on the transport path 130 can be prevented.

Further, since the first through-hole 136A is provided in the first guide 136 and the second through-hole 137A is provided in the second guide 137, a disadvantage that the transmission waves are blocked by the first guide 136 or the reception waves are blocked by the second guide 137 can be prevented.

In the present embodiment, the distance between the first through-hole 136A and the transmission surface 151F of the transmitter 151 is the short-distance sound field limit distance $L_N$ of the transmission waves.

When the medium P is transported along the transport path 130, the medium P may be caught in the first through-hole 136A, and a wrinkle or a jam may occur on the medium P. Therefore, an opening size of the first through-hole 136A is preferably as small as possible. On the other hand, the first through-hole 136A is a hole portion through which the transmission waves pass. When a diameter of the first through-hole 136A is smaller than the beam diameter of the transmission waves, the sound pressure of the transmission waves input to the medium P also decreases and the S/N ratio deteriorates. Therefore, it is necessary for the first through-hole 136A to be formed to have a diameter equal to or larger than the beam diameter of the transmission waves and have a minimum opening area. On the contrary, in the present embodiment, since the first through-hole 136A is provided by the short-distance sound field limit distance $L_N$ within which the beam diameter of the transmission waves is the smallest, the opening area of the first through-hole 136A can be made as small as possible in accordance with the beam diameter. Accordingly, occurrence of the wrinkle and the jam of the medium P can be prevented.

In the present embodiment, $T_0 \geq T_N$, $R_0 < R_1$, and $R_0 < T_N$, wherein $T_0$ is the projection area obtained by projecting the transmission surface 151F on the first guide surface 136B along the sound axis 15C, $R_0$ is the projection area obtained by projecting the reception surface 152F on the second guide surface 137B along the sound axis 15C, $R_1$ is the opening area of the second through-hole 137A, and $T_N$ is the cross-sectional area of the beam cross-section that is at the short-distance sound field limit distance $L_N$ of the transmission waves and is parallel to the transport path 130.

In the present embodiment, $T_0 \geq T_N$, the transmission waves whose beam diameter is converged at the short-distance sound field limit distance are transmitted from the transmission surface 151F, and the transmission waves substantially in accordance with the Cauchy distribution in which the sound pressure on the sound axis 15C reaches a peak are input to the medium P positioned in the long-distance sound field $F_f$. Accordingly, the reception waves also have a sound pressure distribution substantially in accordance with the Cauchy distribution in which the sound pressure on the sound axis 15C reaches a peak, and it is preferable to receive the ultrasonic waves of the sound axis 15C. That is, at a position away from the sound axis 15C, other ultrasonic wave components such as multiple reflections are likely to be included as noise, but the reception waves in the vicinity of the sound axis 15C has a high sound pressure and is less influenced by the noise. Therefore, when $R_0 < T_N$ and the reception waves in the vicinity of the sound axis 15C are received by the receiver 152, the multi-feed determination based on the reception signal can be performed with high accuracy.

In this case, the opening area of the second through-hole 137A can be made small as long as the reception waves in the vicinity of the sound axis 15C to be received by the reception surface 152F can pass through the second through-hole 137A. However, when the opening area $R_1$ of the second through-hole 137A is made the same as the projection area $R_0$ of the transmission surface 151F, it becomes difficult to align the reception surface 152F with the second through-hole 137A. For this reason, $R_1 > R_0$ is set to provide a predetermined margin, so that alignment of the reception surface 152F with the second through-hole 137A can be easily performed, and even if positional displacement occurs, it is possible to prevent a decrease in the reception signal as long as the positional displacement is within the margin.

In the present embodiment, the opening area of the first through-hole 136A is set as $T_1$, and $T_0 \geq T_1$. Accordingly, by setting $T_0 \geq T_1$, a disadvantage that the medium P is caught in the first through-hole 136A can be prevented, as described above. Further, by setting $T_1 \geq T_N$, it is possible to have a configuration in which transmission of the transmission waves is not blocked by the first guide 136 and the medium P in the first through-hole 136A can be prevented from being caught.

The image scanner 10 of the present embodiment includes, in addition to the configuration of the transport apparatus as described above, the scanning unit 14 that reads an image formed on the medium P at the reading position of the transport path 130.

As described above, in the present embodiment, the multi-feed of the medium P can be accurately determined by the ultrasonic wave sensor 15. Accordingly, a disadvantage that the scanning unit 14 read images of the multi-fed media P can be prevented. For example, when a first medium P and a second medium P are multi-fed and a back surface of the first medium P and a front surface of the second medium P face each other, an image on the back surface of the first medium P and an image on the front surface of the second medium P cannot be read. In the present embodiment, since the multi-feed of the medium P can be accurately determined, an image reading error as described above can be prevented.

Second Embodiment

Next, a second embodiment according to the present disclosure will be described.

In the first embodiment, although the image scanner 10 including the transport apparatus is exemplified, an electronic device including the transport apparatus according to the present disclosure is not limited thereto. In the second embodiment, a printer including the transport apparatus according to the present disclosure will be described. In the following description, described items are denoted by the same reference numerals, and the description thereof is omitted or simplified.

Figure 15:
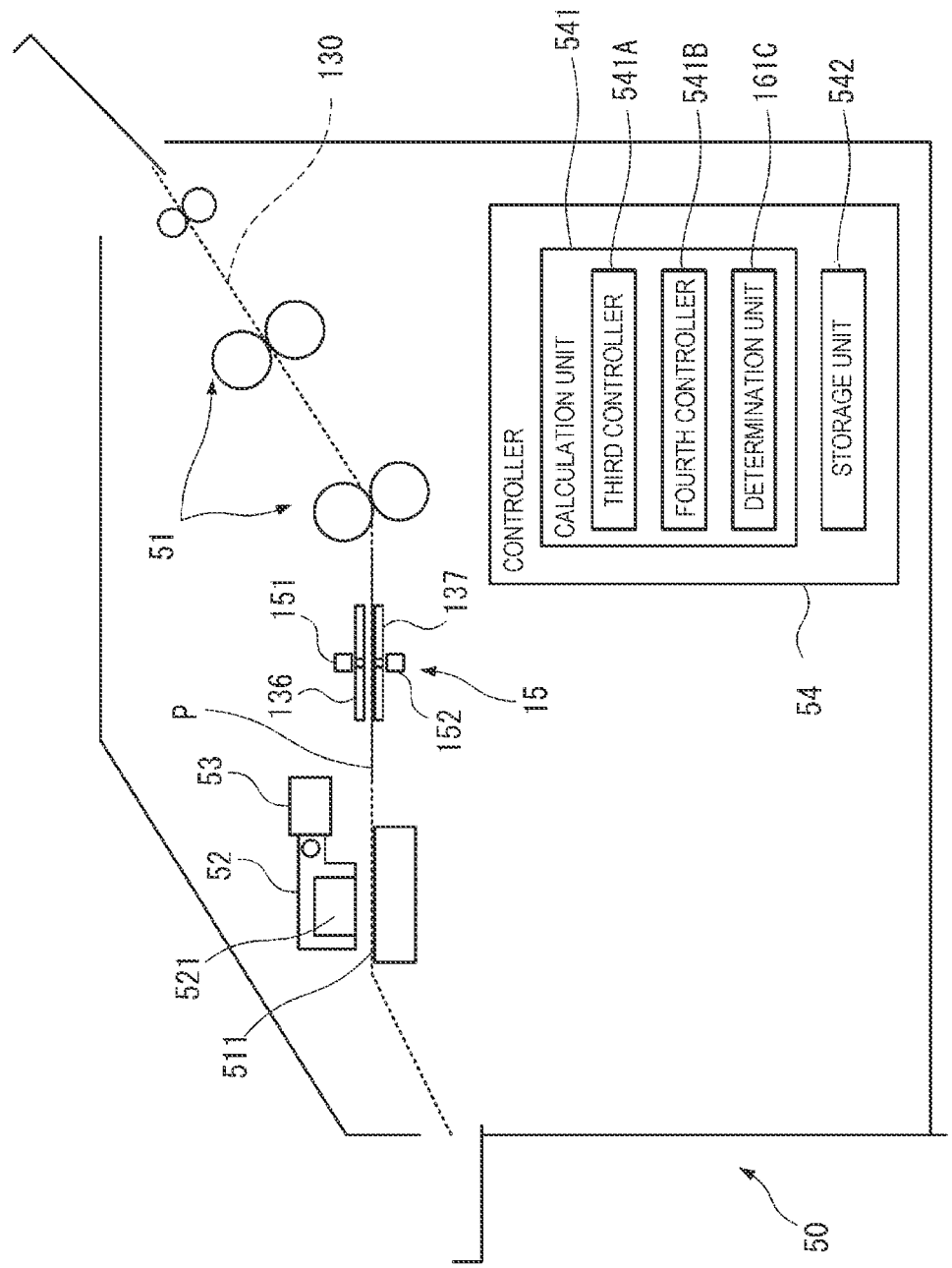
FIG. 15 is a schematic diagram showing a schematic configuration of a printer according to a second embodiment.

FIG. 15 is a schematic diagram showing a schematic configuration of a printer 50 of the second embodiment.

As shown in FIG. 15, the printer 50 includes a transport unit 51 that transports the medium P along the transport path 130, a carriage 52 provided at a predetermined position on the transport path 130, a movement mechanism 53 that moves the carriage 52 along the transport path 130, the ultrasonic wave sensor 15, and a controller 54.

Similar to the transport unit 13 of the first embodiment, the transport unit 51 sends the media P placed on, for example, a tray into the printer 50 one by one, and transports the medium P along the transport path 130. A specific configuration of the transport unit 51 is not particularly limited, and for example, similar to the first embodiment, a mechanism that sends the medium P in a predetermined transport direction by a plurality of roller pairs, and the like can be exemplified.

A platen 511 is provided on the transport path 130 at a position where the platen 511 faces the carriage 52. The printer 50 performs a printing processing on the medium P transported on the platen 511 by using a printing unit 521 provided in the carriage 52.

The carriage 52 is provided at a position where the carriage 52 faces the platen 511, and the printing unit 521 is mounted thereon.

The carriage 52 is provided so as to be movable in a scanning direction orthogonal to the transport direction of the medium P transported by the transport unit 51. The carriage 52 is moved to a predetermined position in the scanning direction by the movement mechanism 53.

The printing unit 521 mounted on the carriage 52 prints an image on the medium P. A method for printing an image on the medium P is not particularly limited. For example, the printing unit 521 includes a nozzle that ejects inks of a plurality of colors supplied from an ink tank, and forms a dot on the medium P by ejecting the inks of respective colors from the nozzle.

The movement mechanism 53 moves the carriage 52 in the scanning direction. By the transport unit 51 transporting the medium P in the transport direction and the movement mechanism 53 moving the carriage 52, a printing position of the printing unit 521 can coincide with a predetermined position of the medium P.

The printer 50 of the present embodiment performs the printing processing by the printing unit 521 on the medium P transported to the platen 511. In the present embodiment, the ultrasonic wave sensor 15 and the first guide 136 and the second guide 137 that sandwich the transport path 130 are provided upstream of the transport path 130 with respect to the platen 511.

The ultrasonic wave sensor 15, the first guide 136, and the second guide 137 are similar to those in the above-described first embodiment.

The controller 54 includes a calculation unit 541 configured with a CPU and the like, and a storage unit 542 configured with a recording apparatus such as a memory.

The controller 54 is coupled to the transport unit 51, the printing unit 521, the movement mechanism 53, and the ultrasonic wave sensor 15, and controls driving of the transport unit 51, the printing unit 521, the movement mechanism 53, and the ultrasonic wave sensor 15. Further, although illustration is omitted, the controller 54 is coupled to an external device such as a personal computer and receives various image data input from these external devices.

The storage unit 542 records various data and various programs for controlling the printer 50.

The calculation unit 541 functions as a third controller 541A, a fourth controller 541B, a determination unit 161C, and the like as shown in FIG. 15 by reading and executing the various programs stored in the storage unit 542.

The third controller 541A controls the transport unit 51 so as to transport the media P set on the tray one by one along the transport path 130.

The fourth controller 541B causes the carriage 52 to move in the scanning direction and causes the printing unit 521 to eject an ink so as to form an image on the medium P. A two-dimensional image is formed on the medium P by the transport of the medium P by the third controller 541A and the movement and the printing processing of the carriage 52 by the fourth controller 541B.

Similar to the first embodiment, the determination unit 161C determines the multi-feed of the medium P based on a reception signal output from the ultrasonic wave sensor 15.

Similar to the first embodiment, the present embodiment as described above includes the ultrasonic wave sensor 15 that performs multi-feed determination based on ultrasonic waves on the medium P transported to the transport path 130. Therefore, a function and effects similar to those of the above-described first embodiment can be achieved, and the multi-feed of the medium P can be accurately determined by the ultrasonic wave sensor 15.

Further, the present embodiment further includes the printing unit 521 that forms an image on the medium P transported to the platen 511.

Accordingly, a disadvantage that an image is formed on the multi-fed media P can be prevented, and an image can be appropriately formed on the medium P.

Modifications

The present disclosure is not limited to the embodiments described above, and configurations obtained through modifications, alterations, and appropriate combinations of the embodiments within a scope of being capable of achieving the object of the present disclosure are included in the present disclosure.

First Modification

In the above-described embodiments, an example in which the sound axis 15C is inclined at the angle θ with respect to the normal line of the medium P when the ultrasonic wave sensor 15 is viewed from the transport direction has been shown, but the present disclosure is not limited thereto.

For example, the transmitter 151 and the receiver 152 may be arranged such that the sound axis 15C is inclined at the angle θ with respect to the normal line of the medium P when the ultrasonic wave sensor 15 is viewed from a direction intersecting the transport direction.

Second Modification

In the above-described embodiments, an example in which the transmitter 151 is disposed above the transport path 130 and the receiver 152 is disposed below the transport path 130 has been shown, but the present disclosure is not limited thereto. The transmitter 151 may be disposed below the transport path 130, and the receiver 152 may be disposed above the transport path 130. Further, in the above-described embodiments, the transport path 130 is horizontal at the position where the ultrasonic wave sensor 15 is disposed. However, the transport path 130 may perpendicularly transport the medium P, and in this case, the transmitter 151 and the receiver 152 may be arranged horizontally with the transport path 130 sandwiched therebetween.

Third Modification

In the above-described embodiments, an example in which the second guide surface 137B of the second guide 137 coincides with the transport path 130 has been shown, but the present disclosure is not limited thereto. For example, the first guide surface 136B may coincide with the transport path 130, a spacer may be provided for the second guide surface 137B, and a position of the transport path 130 may be defined by the spacer.

Fourth Modification

In the above-described embodiments, an example in which the first guide 136 and the second guide 137 that sandwich the transport path 130 are provided has been shown, but the present disclosure is not limited thereto. The first guide 136 and the second guide 137 may not be provided.

Fifth Modification

In the above-described embodiments, an example in which the distance from the transmission surface 151F of the transmitter 151 to the first through-hole 136A is the short-distance sound field limit distance $L_N$ has been shown, but the present disclosure is not limited thereto. For example, the distance from the transmission surface 151F of the transmitter 151 to the first through-hole 136A may be smaller than the short-distance sound field limit distance $L_N$. Even in this case, an influence of noise on a reception signal can be prevented as long as the medium P is provided in the long-distance sound field $F_f$. Further, in the short-distance sound field $F_n$, as shown in FIG. 12, the beam diameter becomes smaller in accordance with the distance from the transmission surface 151F. Therefore, the opening area of the first through-hole 136A can be made small as long as the first through-hole 136A is formed such that the ultrasonic waves having the beam diameter can pass therethrough.

Sixth Modification

In the first embodiment, an example in which the projection area $T_0$ of the transmission surface 151F, the opening area $T_1$ of the first through-hole 136A, the projection area $R_0$ of the reception surface 152F, and the opening area $R_1$ of the second through-hole 137A satisfy $T_0 \geq T_1 \geq T_N$, $R_0 < R_1$, $R_0 < T_N$ has been shown, but the present disclosure is not limited thereto.

For example, $T_0 \geq T_1 \geq T_N$, $R_0 > R_1$, and $R_0 \geq T_1$ may be set. In this case, by narrowing the opening area such that only the reception waves in the vicinity of the sound axis 15C pass through the second through-hole 137A, the receiver 152 can receive the reception waves having a large sound pressure in the vicinity of the sound axis 15C. In this case, $R_0 = R_1$ may be set, but it is difficult to align the reception surface 152F with the second through-hole 137A. For this reason, $R_0 > R_1$ is set, so that even if the position of the reception surface 152F with respect to the second through-hole 137A is slightly displaced, the reception waves that have passed through the second through-hole 137A can be received by the reception surface 152F.

Seventh Modification

In the above-described embodiments, the controllers 16 and 54 function as the determination unit 161C and determine the multi-feed of the medium P based on the reception signal from the receiver 152, but the present disclosure is not limited thereto. For example, when a type of the transported medium P is known, the controllers 16 and 54 may detect a thickness of the medium P based on the reception signal from the receiver 152.

In the second embodiment, the determination unit 161C may further determine the type of the medium P based on the reception signal from the ultrasonic wave sensor 15.

That is, a sound pressure of the reception waves that have passed through the medium P differs depending on the type of the medium P and whether there is a single-layer medium P or whether there are double-layer media P. Therefore, regarding the plurality of media P, a transmission and reception processing of the ultrasonic waves is performed a plurality of times for a single layer and double layers, and signal values of obtained reception signals are obtained in advance as teacher data. Then, based on these pieces of teacher data, a learning model in which the signal value of the reception signal is input and the type of the medium P and a multi-feed determination result (a single layer or double layers) are output is generated by machine learning. In this case, the determination unit 161C can obtain the type of the medium P and the multi-feed determination result only by inputting the signal value of the reception signal to the learning model.

Further, the fourth controller 541B may obtain a printing profile corresponding to the determined type of the medium P and control, based on the printing profile, an amount of ink ejected to the medium P so as to perform the printing processing.

Overview of Present Disclosure

A transport apparatus according to a first aspect of the present disclosure includes: a transport path on which a medium is transported; a transmitter configured to transmit an ultrasonic wave; and a receiver configured to receive an ultrasonic waves, in which the transport path is provided between the transmitter and the receiver, and is provided in a long-distance sound field of an ultrasonic wave transmitted by the transmitter.

Accordingly, the ultrasonic waves (the transmission waves) transmitted from the transmitter and input to the medium have the sound pressure distribution in accordance with the Cauchy distribution in which the sound pressure on the sound axis reaches a peak. Therefore, the ultrasonic waves (the reception waves) that have passed through the medium also have the sound pressure distribution in accordance with the Cauchy distribution in which the sound pressure on the sound axis reaches a peak. Therefore, as compared with a case where transmission waves having a complicated sound pressure distribution as seen in the short-distance sound field are input to the medium, the noise component included in the reception waves can be reduced, and the multi-feed and the thickness of the medium can be accurately detected based on the reception signal from the receiver.

The transport apparatus according to the first aspect may further include a first guide provided between the transport path and the transmitter; and a second guide provided between the transport path and the receiver, in which the first guide includes a first through-hole through which an ultrasonic wave transmitted from the transmitter passes, and the second guide includes a second through-hole through which an ultrasonic wave transmitted from the medium passes.

Accordingly, the medium is guided and transported by the first guide and the second guide, and interference with other members while the medium is transported can be prevented. Therefore, the wrinkle and the jam that occur when the medium interferes with other members can be prevented. Further, since the first guide is provided with the first through-hole and the second guide is provided with the second through-hole, the disadvantage that the transmission waves are blocked by the first guide and the disadvantage that the reception waves are blocked by the second guide can be prevented.

In the transport apparatus according to the first aspect, a distance between the first through-hole and the transmitter may be a short-distance sound field limit distance of an ultrasonic wave transmitted from the transmitter.

Accordingly, the opening size of the first through-hole can be set to a minimum size through which the ultrasonic wave beam of the transmission waves can pass, and the disadvantage that the medium is caught in the first through-hole can be prevented.

In the transport apparatus according to the first aspect, $T_0 \geq T_N$, $R_0 < R_1$, and $R_0 < T_N$, wherein $T_0$ is a projection area obtained by projecting a transmission surface that transmits an ultrasonic wave of the transmitter on the first guide along a sound axis, $R_0$ is a projection area obtained by projecting a reception surface that receives an ultrasonic wave of the receiver on the second guide along the sound axis, $R_1$ is an opening area of the second through-hole, and $T_N$ is a cross-sectional area of a beam cross-section parallel to the transport path at the short-distance sound field limit distance of an ultrasonic wave transmitted from the transmitter.

In this aspect, $T_0 \geq T_N$, and the transmission waves transmitted from the transmitter form a sound field that converges at the short-distance sound field limit distance. In this case, the transmission waves having the sound pressure distribution substantially in accordance with the Cauchy distribution in which the sound pressure on the sound axis reaches a peak are input to the medium provided in long-distance sound waves. Therefore, the reception waves also have the sound pressure distribution substantially in accordance with the Cauchy distribution in which the sound pressure on the sound axis reaches a peak. In this case, the receiver preferably receives the ultrasonic waves in the vicinity of the sound axis of the reception waves. In this aspect, since $R_o<T_N$, the reception waves in the vicinity of the sound axis can be received by the receiver, and accuracy of various processings such as the multi-feed determination based on the reception signal can be improved. Further, the opening area of the second through-hole can be made small as long as the reception waves in the vicinity of the sound axis received by the receiver can pass through the second through-hole.

On the other hand, when $R_1=R_0$, it becomes difficult to align the reception surface with the second through-hole. For this reason, in this aspect, $R_1>R_0$, so that a certain margin is provided, and the reception surface can be easily aligned with the second through-hole.

In the transport apparatus according to the present aspect, $T_0 \geq T_1$, wherein $T_1$ is an opening area of the first through-hole.

Accordingly, by setting $T_0 \geq T_1$, the medium can be prevented from being caught in the first through-hole.

An image scanner according to a second aspect of the present disclosure includes the transport apparatus according to the first aspect; and a scanning unit configured to read an image formed on the medium transported by the transport apparatus.

Accordingly, the controller can perform the highly accurate multi-feed determination based on the reception signal from the receiver of the transport apparatus. Therefore, the disadvantage that the images of the multi-fed media P are read can be prevented.

A printer according to a third aspect of the present disclosure includes the transport apparatus according to the first aspect, and a printing unit configured to form an image on the medium transported by the transport apparatus.

Accordingly, the disadvantage that an image is formed on the multi-fed media P can be prevented, and an image can be appropriately formed on the medium P.

What is claimed is:

1. A transport apparatus, comprising:
a transport path on which a medium is transported;
a transmitter including a first ultrasonic wave transducer configured to transmit an ultrasonic wave;
a receiver including a second ultrasonic wave transducer configured to receive the ultrasonic wave, wherein
the transport path is provided between the transmitter and the receiver,
the transport path is provided in a long-distance sound field of the ultrasonic wave transmitted from the transmitter, and i
n the long-distance sound field, a sound pressure distribution of the ultrasonic wave transmitted from the transmitter corresponds to a Cauchy distribution; and
a first guide provided between the transport path and the transmitter, wherein
the long-distance sound field of the ultrasonic wave corresponds to a field from a position of the first guide,
the first guide includes a first through-hole through which the ultrasonic wave transmitted from the transmitter passes,
the transport path is positioned closer to the receiver than the first through-hole,
a distance between the first through-hole and the transmitter is a short-distance sound field limit distance of the ultrasonic wave transmitted from the transmitter,
at the short-distance sound field limit distance, a beam diameter of a plurality of beam diameters of the ultrasonic wave transmitted from the transmitter is smallest among the plurality of beam diameters, wherein each of the plurality of beam diameters are associated with distinct cases where transmission surfaces with a circular shape contain different diameters and different short-distance sound field limit distances,
and To>T1>TN, wherein To is a projection area obtained by projecting a transmission surface that transmits the ultrasonic wave of the transmitter on the first guide along a sound axis, Ti is an opening area of the first through-hole, and TN is a cross-sectional area of a beam cross-section parallel to the transport path at the short-distance sound field limit distance of the ultrasonic wave transmitted from the transmitter.

2. The transport apparatus according to claim 1, further comprising a second guide provided between the transport path and the receiver, wherein the second guide includes a second through-hole through which the ultrasonic wave transmitted from the medium passes.

3. The transport apparatus according to claim 2, wherein $R_0<R_1$ and $R_0<T_N$, wherein $R_0$ is a projection area obtained by projecting a reception surface that receives the ultrasonic wave of the receiver on the second guide along the sound axis, and $R_1$ is an opening area of the second through-hole.

4. An image scanner, comprising:
the transport apparatus according to claim 1; and
circuitry configured to read an image formed on the medium transported by the transport apparatus.

5. An image scanner, comprising:
the transport apparatus according to claim 2; and
circuitry configured to read an image formed on the medium transported by the transport apparatus.

6. An image scanner, comprising:
the transport apparatus according to claim 3; and
circuitry configured to read an image formed on the medium transported by the transport apparatus.

7. A printer, comprising:
the transport apparatus according to claim 1; and
circuitry configured to form an image on the medium transported by the transport apparatus.

8. A printer, comprising:
the transport apparatus according to claim 2; and
circuitry configured to form an image on the medium transported by the transport apparatus.

9. A printer, comprising:
the transport apparatus according to claim 3; and
circuitry configured to form an image on the medium transported by the transport apparatus.

* * * * *